(12) United States Patent
Sasada et al.

(10) Patent No.: US 12,276,641 B2
(45) Date of Patent: Apr. 15, 2025

(54) METHOD FOR PREDICTING SPRINGBACK AMOUNT AND METHOD FOR BENDING DEFORMED REINFORCING BAR

(71) Applicants: THE DOSHISHA, Kyoto (JP); TOYO KENSETSU KOHKI CO., LTD., Osaka (JP)

(72) Inventors: Masahiro Sasada, Kyotanabe (JP); Ikuho Matsukuma, Kyotanabe (JP); Satoshi Higaki, Osaka (JP)

(73) Assignees: THE DOSHISHA, Kyoto (JP); TOYO KENSETSU KOHKI CO., LTD., Osaka (JP)

(*) Notice: Subject to any disclaimer, the term of this patent is extended or adjusted under 35 U.S.C. 154(b) by 311 days.

(21) Appl. No.: 17/931,849

(22) Filed: Sep. 13, 2022

(65) Prior Publication Data

US 2023/0086958 A1 Mar. 23, 2023

(30) Foreign Application Priority Data

Sep. 17, 2021 (JP) .................................. 2021-152602

(51) Int. Cl.
*G01N 3/20* (2006.01)
*G01N 3/06* (2006.01)

(52) U.S. Cl.
CPC .................. *G01N 3/20* (2013.01); *G01N 3/06* (2013.01); *G01N 2203/0023* (2013.01)

(58) Field of Classification Search
CPC ............... B21D 7/12; B21D 7/14; G01N 3/20
See application file for complete search history.

(56) References Cited

U.S. PATENT DOCUMENTS

| 3,653,251 A | * | 4/1972 | Coonan | ..................... | B21D 7/12 |
| | | | | | 72/702 |
| 3,812,694 A | * | 5/1974 | Peddinghaus | .......... | B21D 11/12 |
| | | | | | 72/702 |
| 3,821,525 A | | 6/1974 | Eaton et al. | | |
| 4,732,025 A | * | 3/1988 | Marlinga | ............... | B21D 9/073 |
| | | | | | 72/18.5 |

(Continued)

FOREIGN PATENT DOCUMENTS

| CN | 101898211 A | 12/2010 |
| CN | 114993235 A | 9/2022 |

(Continued)

*Primary Examiner* — Tran M. Tran
(74) *Attorney, Agent, or Firm* — Studebaker Brackett PLLC

(57) ABSTRACT

There are provided a method for predicting a springback amount and a method for bending a deformed reinforcing bar including: supplying the deformed reinforcing bar bending the supplied deformed reinforcing bar, and subsequently measuring a first bending angle in a state of releasing a bending force on the deformed reinforcing bar; further bending the reinforcing bar from which the bending force has been released, and subsequently measuring a second bending angle in a state of releasing the bending force; and predicting a relationship between the bending angle and the springback amount by using the measurement results after executing the further bending once or a plurality of times, in which the bending angle is greater for subsequent steps.

6 Claims, 7 Drawing Sheets

(56) References Cited

U.S. PATENT DOCUMENTS

| | | | | |
|---|---|---|---|---|
| 4,979,385 A | * | 12/1990 | LaFrasse | B21D 7/14 72/149 |
| 4,989,439 A | * | 2/1991 | Ewert | B21D 25/02 72/702 |
| 5,275,031 A | | 1/1994 | Whiteside et al. | |
| 5,285,578 A | * | 2/1994 | Sovereen | G01B 5/24 33/534 |
| 5,535,611 A | * | 7/1996 | Lilie | B21D 7/14 72/702 |
| 5,743,124 A | * | 4/1998 | Sugiyama | B21D 7/025 72/166 |
| 5,797,289 A | * | 8/1998 | Hoshino | B21D 7/14 72/149 |
| 5,836,188 A | * | 11/1998 | Mahan | B21D 7/12 72/21.4 |
| 5,992,210 A | * | 11/1999 | Blurton-Jones | B21D 7/14 72/16.1 |
| 6,637,121 B2 | | 10/2003 | Barefoot | B23K 31/125 33/501.45 |
| 7,027,048 B2 | * | 4/2006 | Brombolich | G06F 30/23 702/42 |
| 7,130,714 B1 | * | 10/2006 | Kulkarni | B21D 22/10 700/165 |
| 7,584,637 B2 | * | 9/2009 | Ghiran | B21D 7/12 72/149 |
| 10,089,422 B2 | * | 10/2018 | Sumikawa | G06F 17/16 |
| 10,092,937 B2 | * | 10/2018 | Dani | G01B 5/213 |
| 10,260,234 B1 | * | 4/2019 | Kuo | E04C 1/38 |
| 10,352,836 B2 | * | 7/2019 | Shirakami | G01N 3/24 |
| 10,953,448 B2 | * | 3/2021 | Lan | B21D 7/14 |
| 10,956,634 B2 | * | 3/2021 | Shen | G06F 30/23 |
| 11,007,560 B2 | * | 5/2021 | Matsuo | B21D 7/12 |
| 11,833,572 B2 | * | 12/2023 | Fiorentini | B21D 7/14 |
| 11,911,816 B2 | * | 2/2024 | Urabe | B21D 22/20 |
| 2003/0050765 A1 | * | 3/2003 | Sasahara | G06F 30/00 702/155 |
| 2010/0281942 A1 | | 11/2010 | Carlini | |
| 2013/0192164 A1 | * | 8/2013 | Covarrubias Torres | E04C 5/03 52/851 |
| 2019/0161968 A1 | * | 5/2019 | Kar | E04C 5/03 |
| 2023/0228552 A1 | * | 7/2023 | Kerns | G01B 7/30 73/1.75 |

FOREIGN PATENT DOCUMENTS

| | | |
|---|---|---|
| JP | S48-103067 A | 12/1973 |
| JP | S59-092120 A | 5/1984 |
| JP | 2011-508674 A | 3/2011 |
| KR | 10-2018-0075230 A | 7/2018 |

* cited by examiner

METHOD FOR PREDICTING SPRINGBACK AMOUNT AND METHOD FOR BENDING DEFORMED REINFORCING BAR

CROSS-REFERENCE TO RELATED APPLICATIONS

This application is based on and claims priority under 35 USC 119 from Japanese Patent Application No. 2021-152602 filed on Sep. 17, 2021, the contents of which are incorporated herein by reference.

TECHNICAL FIELD

The present disclosure relates to a method for predicting a springback amount during bending of a deformed reinforcing bar, and a method for bending the deformed reinforcing bar.

BACKGROUND ART

It is known that springback occurs during bending of a metal member, and bending has to be performed in consideration of the springback amount.

JP2011-508674A and JPS48-103067A describe techniques for predicting the springback amount when bending a long metal member such as a pipe and the like.

JP2011-508674A describes performing a pair of bending processes on a test pipe and measuring the resulting bending angle in order to calculate a springback parameter of a long member such as a pipe and the like.

JPS48-103067A describes predicting the springback amount during bending of a pipe based on the results of performing two different test bending.

Both of the prediction techniques of JP2011-508674A and JPS48-103067A are premised on the assumption that members to be bent are uniform, and accordingly predict the springback amount based on the result of bending other test pipe or a different bending portion in a calibration pipe. However, when applied to prediction of a springback amount of a member such as a deformed reinforcing bar whose cross section is not uniform in the axial and circumferential directions, the error increases. That is, in the bending process of a member such as a deformed reinforcing bar whose cross section is not uniform in the axial and circumferential directions, since the behavior of the bending process varies depending on a mode of mounting to the bending device, the bending position, and the like, the error increases when the bending results of other members or different portions are used.

SUMMARY OF INVENTION

The present disclosure provides a prediction method for easily and accurately predicting a springback amount during bending of a deformed reinforcing bar, and a method for bending a deformed reinforcing bar using the prediction result.

According to a first illustrative aspect of the present disclosure, a method for predicting a springback amount during a bending process of a deformed reinforcing bar by using a reinforcing bar bending device including a fulcrum member configuring a fulcrum in the bending process and an effort member rotated around the fulcrum member includes: a reinforcing bar supply step of supplying the deformed reinforcing bar to the reinforcing bar bending device; a first bending angle measurement step of bending the supplied deformed reinforcing bar by rotating the effort member to a predetermined bending angle, and subsequently measuring a first bending angle of the deformed reinforcing bar in state of releasing a bending force of the effort member on the deformed reinforcing bar; a second bending angle measurement step of further bending the reinforcing bar from which the bending force of the effort member has been released to another bending angle, and subsequently measuring a second bending angle of the deformed reinforcing bar in a state of releasing the bending force of the effort member on the deformed reinforcing bar; and a springback prediction step of predicting a relationship between the bending angle and the springback amount by using a measurement result of the first bending angle measurement step and a measurement result of the second bending angle measurement step after executing the second bending angle measurement step once or a plurality of times, in which the another bending angle in the second bending angle measurement step is greater than the predetermined bending angle in the first bending angle measurement step performed immediately before, or the another bending angle in the second bending angle measurement step performed immediately before.

According to a second illustrative aspect of the present disclosure, the predetermined bending angle in the first bending angle measurement step and the another bending angle in the second bending angle measurement step are determined based on a target bending angle when bending the deformed reinforcing bar by using a prediction result of the springback amount.

According to a third illustrative aspect of the present disclosure, a method for bending a deformed reinforcing bar by using the method for predicting a springback amount according to the first or second aspect includes: bending a supplied deformed reinforcing bar to a set bending angle which is determined based on a target bending angle and the prediction result of the springback amount, by using the reinforcing bar bending device that is used for predicting the springback amount.

According to a fourth illustrative aspect of the present disclosure, the method for bending a deformed reinforcing bar further includes: bending the deformed reinforcing bar that is used for predicting the springback amount to the set bending angle.

According to the method for predicting a springback amount of the first aspect, it is possible to provide a prediction method for easily and accurately predicting a springback amount during bending of a deformed reinforcing bar.

According to the method for predicting a springback amount of the second aspect, in predicting the springback amount, by setting of the bending angle of the bending angle measurement step based on the target bending angle, it is possible to distribute angles at predetermined angle intervals suitable for the target bending angle, and thereby enables selecting of an optimum bending angle for the prediction of the springback amount.

According to the method for bending a deformed reinforcing bar of the third aspect, by using the prediction result of the springback amount, it is possible to provide a method for bending a deformed reinforcing bar with little error.

That is, by using the actual bending machine for the reinforcing bar bending device used for predicting the springback amount, the error of the predicted numerical value can be reduced, and as a result, the springback amount can be predicted extremely accurately, so that it is possible to bend the deformed reinforcing bar to a very accurate target bending angle.

According to the method for bending a deformed reinforcing bar of the fourth aspect, when bending the deformed reinforcing bar, since the springback amount at the target bending angle is data based on the measurement of the springback amount of the reinforcing bar itself that is the subject to be bent, the set bending angle can be determined with extremely accurate prediction, and extremely accurate bending is possible.

BRIEF DESCRIPTION OF DRAWINGS

FIGS. 3A and 3B are enlarged views of an example of a deformed reinforcing bar as a subject to be processed according to the present disclosure, in which FIG. 3A is a partial cross-sectional view illustrating an outer surface of the deformed reinforcing bar and a cross section in the axial direction, and FIG. 3B is a cross-sectional view taken along the line A-A in FIG. 3A;

DESCRIPTION OF EMBODIMENTS

Hereinafter, a method for predicting a springback amount and a method for bending a deformed reinforcing bar according to the present disclosure will be described with reference to FIGS. 1 to 7.

Figure 1:
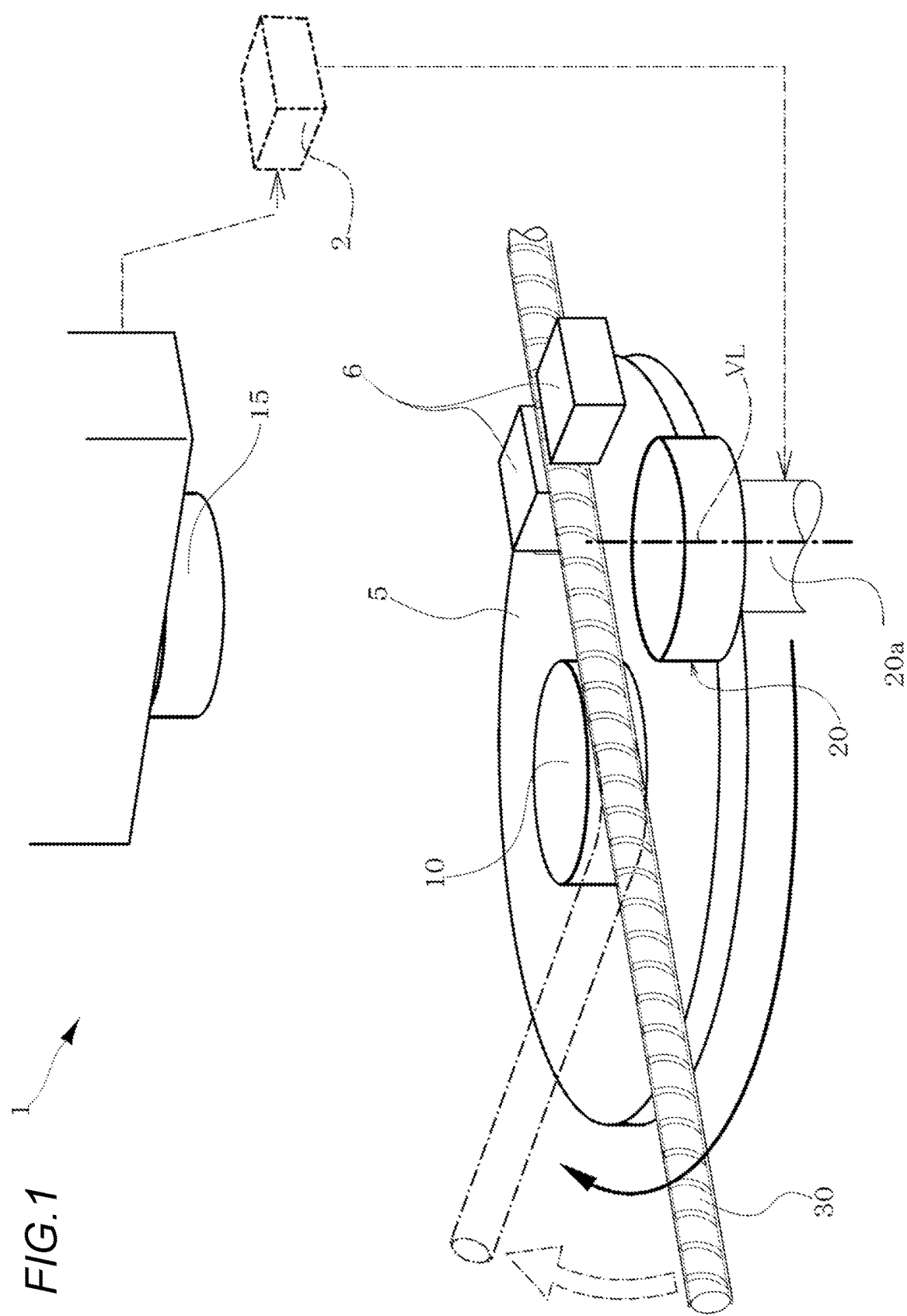
FIG. 1 is a perspective view of a main part of an example of a reinforcing bar bending device used for a method for predicting a springback amount according to the present disclosure.

FIG. 1 is a perspective view of a main part of an example of a reinforcing bar bending device used for the method for predicting a springback amount according to the present disclosure.

A reinforcing bar bending device 1 illustrated in FIG. 1 is a device for bending a deformed reinforcing bar 30 (hereinafter, simply referred to as "reinforcing bar"). The reinforcing bar bending device 1 includes a flat reference surface portion 5 forming a reference plane that determines a bending direction during bending, a fulcrum member 10 forming a fulcrum for bending on the reference surface portion 5, an effort member 20 that turns around the fulcrum member 10 along the reference surface portion 5, an end holding portion 6 that holds one end of the reinforcing bar 30 on the reference surface portion 5 so as not to move, an imaging device 15 capable of capturing an image of a bending state of the reinforcing bar, and a control unit 2 that controls the entire device, and the like.

The effort member 20 includes a roller member rotatably provided on a turn drive shaft 20a extending in the direction of axis VL orthogonal to the reference surface portion 5, and as the outer peripheral surface of the roller member comes into contact with the reinforcing bar 30, bending force is applied to the reinforcing bar 30. In addition, the turn drive shaft 20a is configured so as to be driven by a drive system using a stepping motor and its turning angle can be accurately controlled via the control unit 2.

The imaging device 15 is provided to detect the bending angle of the reinforcing bar 30. For example, for the measurement of the angle, the bending angle is obtained with digital image correlation method based on a moving image captured by the imaging device 15. Then, by using this reinforcing bar bending device 1, the amount by which the bending angle recovers when the reinforcing bar 30 is bent by a predetermined angle, that is, the so-called springback amount $\Delta\theta$ can be measured as described below.

Figure 2:
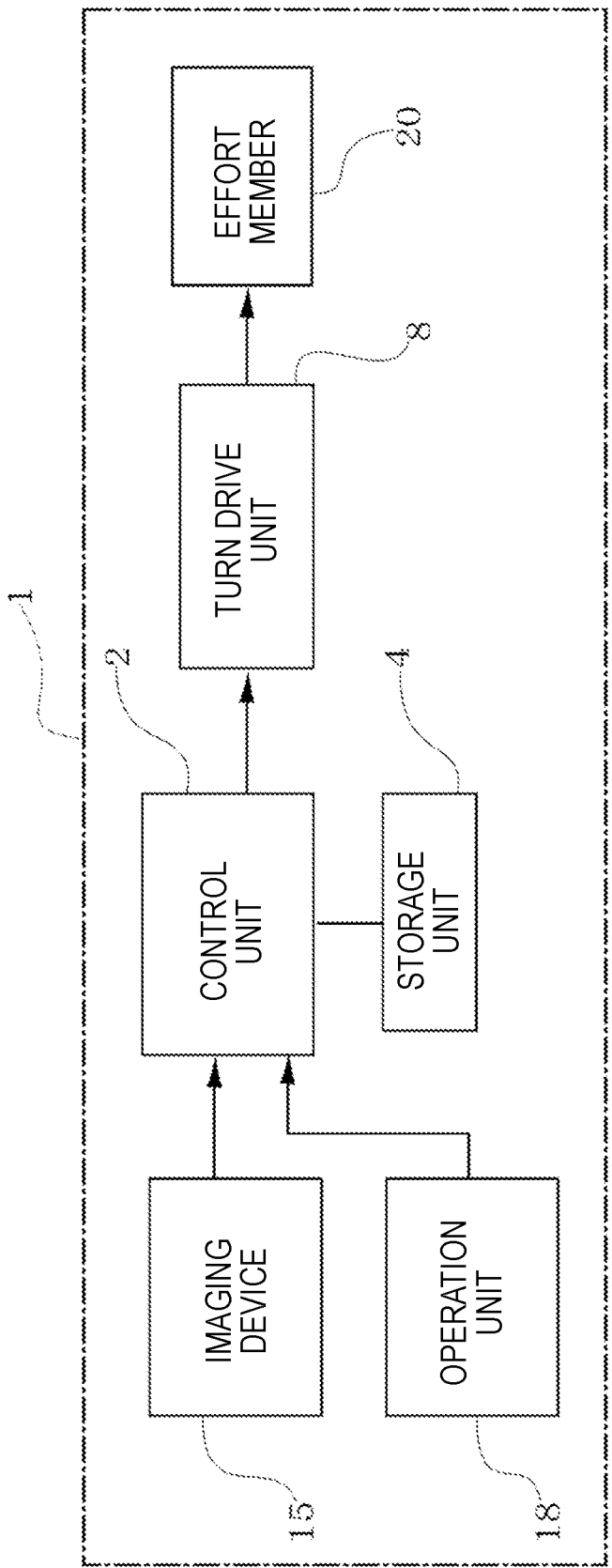
FIG. 2 is a block diagram of a control system of the reinforcing bar bending device.

FIG. 2 illustrates a block diagram of the control system of the reinforcing bar bending device 1.

The reinforcing bar bending device 1 is not particularly limited in its control, but may be configured as illustrated in FIG. 2, for example. Data of an image (moving image) captured by the imaging device 15 provided with a camera or the like is supplied to the control unit 2, and this image data is used for measuring the springback amount. In addition, a storage unit 4 stores various data, measurement data, and the like necessary for bending and uses the same for device control. An operation unit 18 inputs various data necessary for bending, inputs information necessary for device operation, and gives an operation instruction. Further, a turn drive unit 8 controls the turning position of the turn drive shaft 20a that turns the effort member 20 controlled by the control unit 2, and accurately controls the turning angle.

Figure 3A:
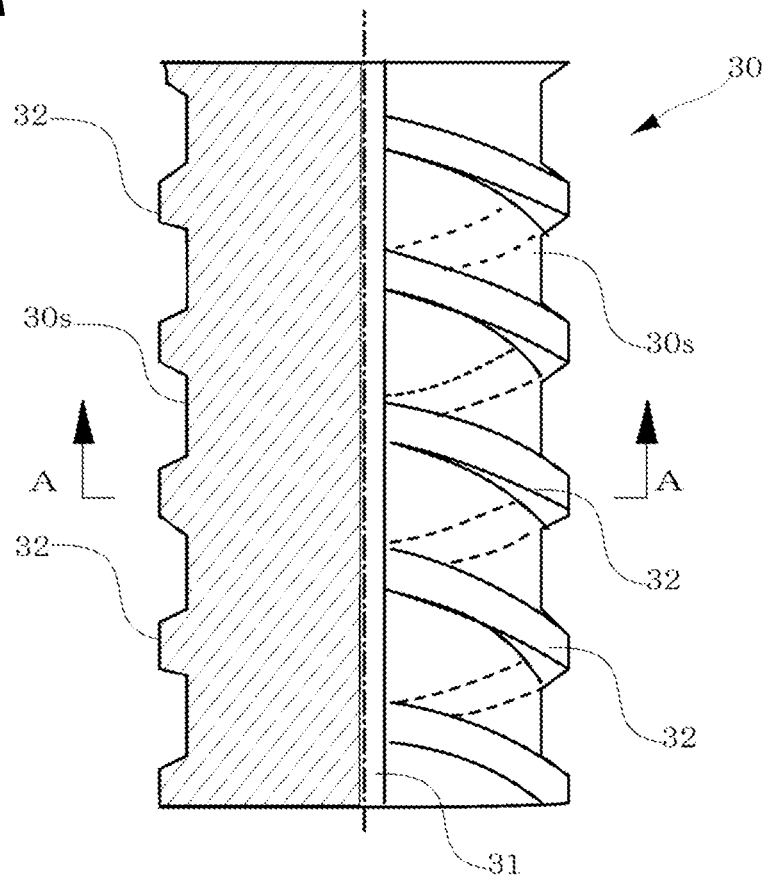
Figure 3B:
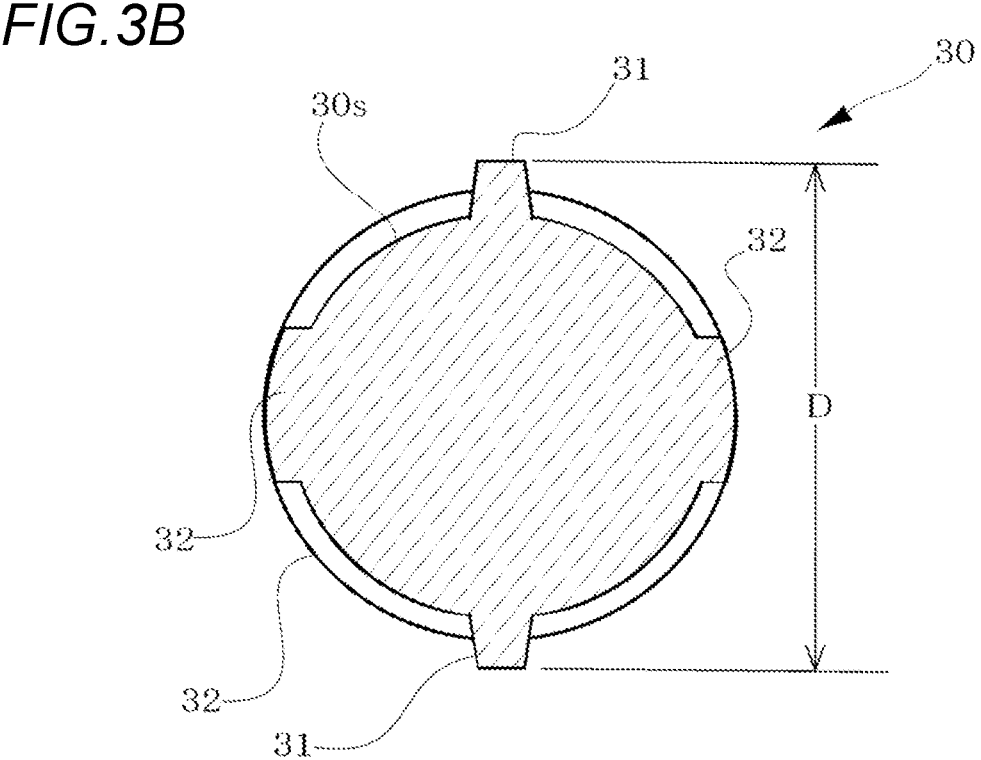

FIGS. 3A and 3B are enlarged views of an example of the reinforcing bar 30 which is a subject to be processed according to the present disclosure, in which FIG. 3A shows a partial cross-sectional view illustrating an outer surface of the reinforcing bar 30 and a cross section in the axial direction, and FIG. 3B shows a cross-sectional view taken along the line A-A in FIG. 3A.

The reinforcing bar 30 used for bending in the present embodiment has a shape in which irregularities are formed by two ribs 31 formed on the reinforcing bar surface 30s in the longitudinal direction of the reinforcing bar, and multiple nodes 32 formed between the ribs 31 in the circumferential direction of the reinforcing bar as illustrated in FIG. 3A, for example. As illustrated in FIG. 3B, the two ribs 31 are provided 180 degrees apart in the circumferential direction of the reinforcing bar. Further, the nodes 32 are provided so as to be slightly inclined in the circumferential direction of the reinforcing bar, and further provided at positions alternately displaced in the axial direction with the ribs 31 interposed therebetween. Further, while the ribs 31 are formed higher than the nodes 32 in the example of FIGS. 3A and 3B, the rib 31 may be formed at the same height, and a portion of the rib 31 forms the outermost diameter B of the reinforcing bar 30.

Figure 4:
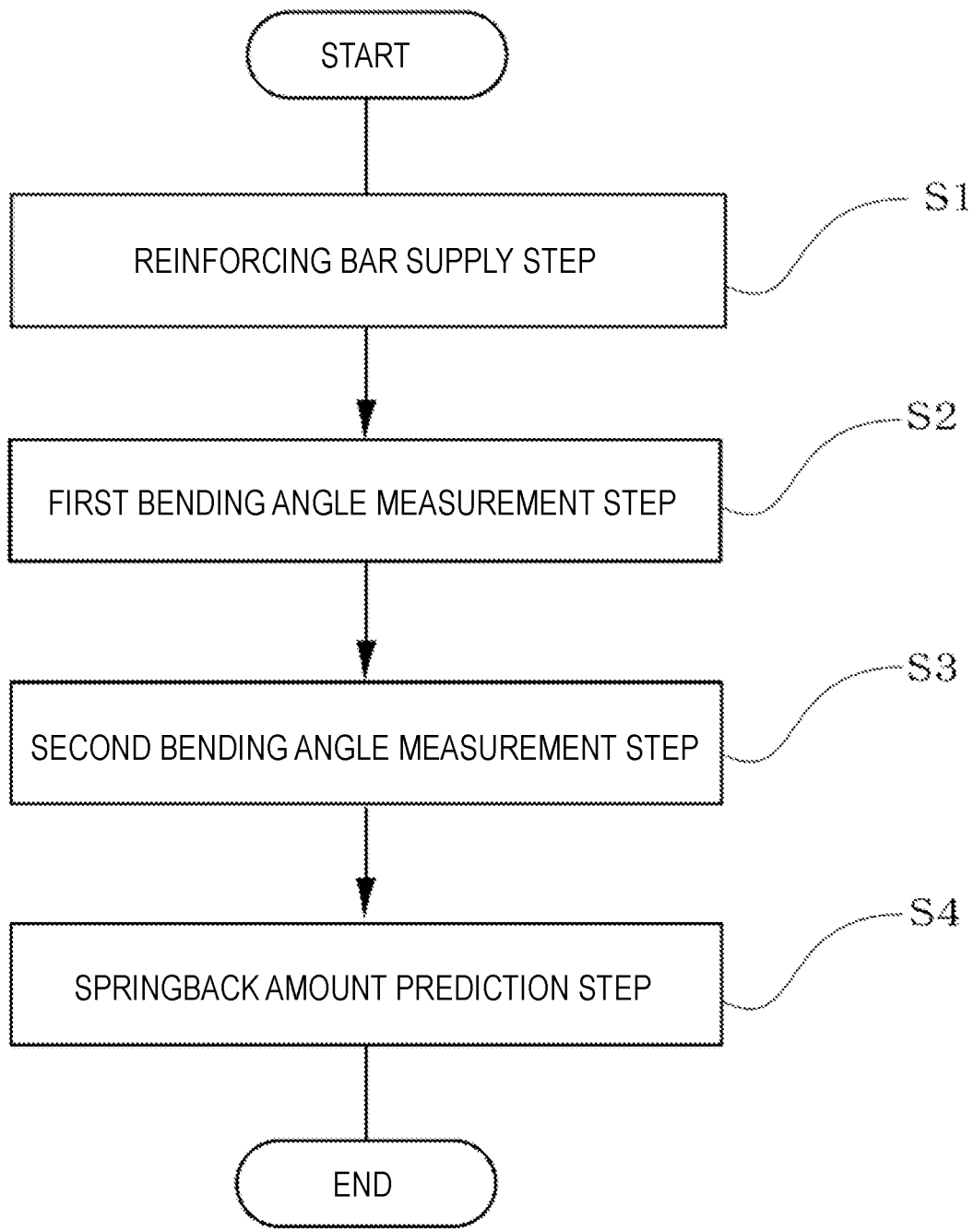
FIG. 4 is a flowchart of a method for predicting a springback amount.

Hereinafter, a method for predicting a springback amount of the reinforcing bar 30 will be described with reference to FIGS. 4 and 5. FIG. 4 illustrates a flowchart of a method for predicting a springback amount, and FIG. 5 illustrates a schematic plan view of a reinforcing bar bending device, illustrating the reinforcing bar in the bent state at each step of the method for predicting a springback amount.

Figure 5:
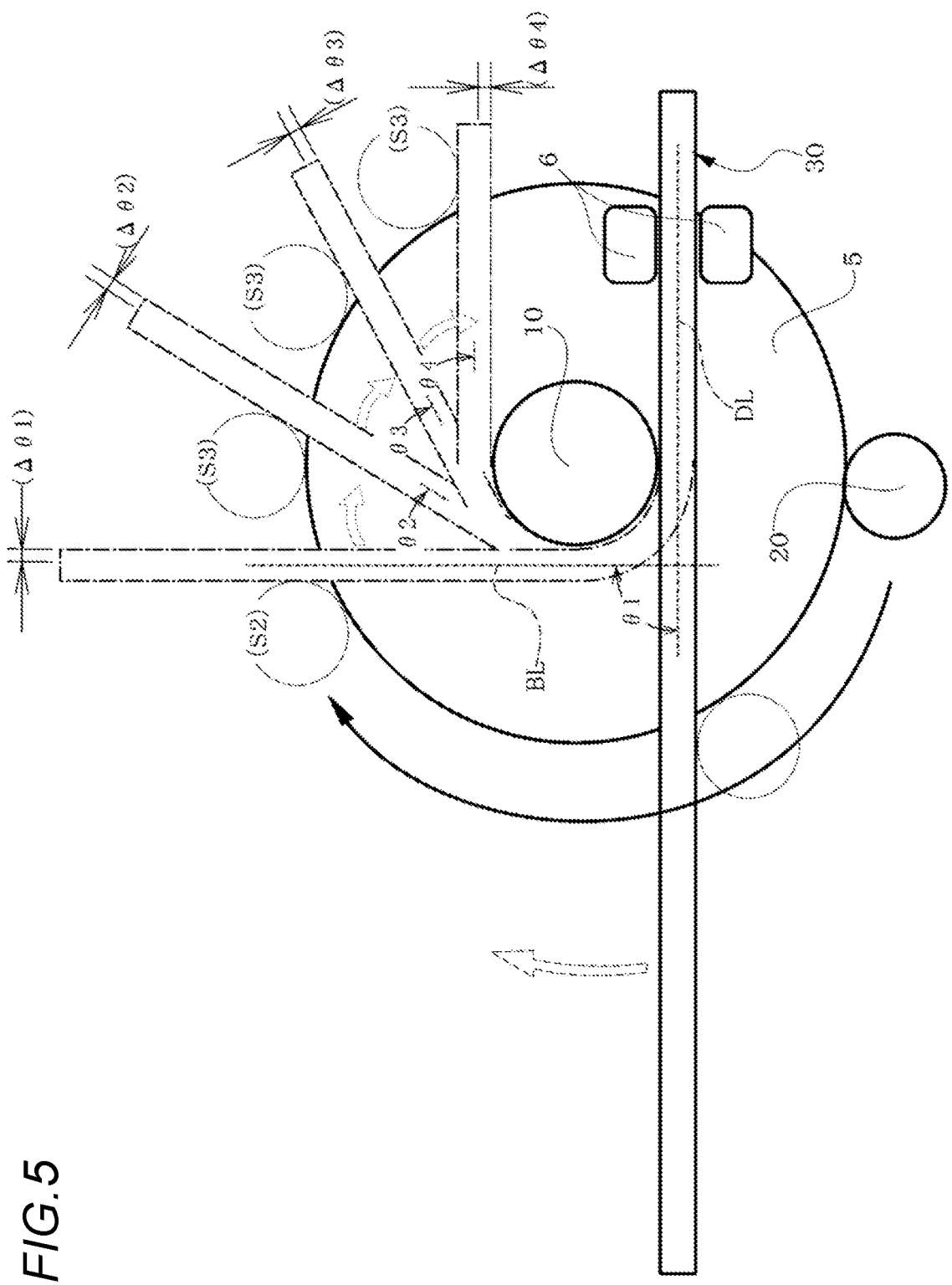
FIG. 5 is a schematic plan view of the reinforcing bar bending device, illustrating the reinforcing bar in the bent states at each step of the method for predicting a springback amount.

Regarding the rotation angle of the effort member 20 (rotation angle of the reinforcing bar 30 in the clockwise direction in the drawing), as illustrated in FIG. 5, the rotation angle θ is shown, which is formed by a reference line DL in the linear state (illustrated state) and a straight line BL in the bent portion of the reinforcing bar 30.

In this case, the camera of the imaging device 15 captures an image from a direction orthogonal to the reference surface portion 5. That is, the imaging device 15 is disposed such that the reference line DL of the reinforcing bar 30 and the straight line BL of the bent portion of the reinforcing bar 30 can be accurately measured.

First, a method for predicting a springback amount will be schematically described.

As illustrated in FIG. 4, the method for predicting a springback amount includes a reinforcing bar supply step S1 of setting the reinforcing bar 30 in the reinforcing bar bending device 1, then a first bending angle measurement step S2 of measuring a springback amount at an angle at which the reinforcing bar 30 is first bent, then a second bending angle measurement step S3 of measuring the springback amount at a position of an angle at which bending is further performed to a greater angle, and a springback prediction step S4 of predicting the relationship between the bending angle and the springback amount by using the measurement results of the first and second bending angle measurement steps S2 and S3.

Each step of the method for predicting a springback amount be described in more detail with reference to FIG. 5.

First, the reinforcing bar supply step S1 is performed. As illustrated in FIG. 5, in the reinforcing bar supply step S1, the reinforcing bar 30 is set at a predetermined position of the reinforcing bar bending device 1. With this method, the side surface of the reinforcing bar 30 is brought into contact with (substantially into contact with) the fulcrum member 10, and the reinforcing bar 30 is positioned and secured on the reference surface portion 5 by the end holding portion 6.

Further, the direction of setting the reinforcing bar 30 is set such that the ribs 31 are aligned in the direction orthogonal to the reference surface portion 5, particularly when the shape is as illustrated in FIGS. 3A and 3B. This causes bending in a direction of intersecting the portion of the outermost diameter D (see FIGS. 3A and 3B) so as to avoid twisting of the reinforcing bar 30, when the outermost diameter D of the reinforcing bar 30 is configured to be relatively larger than the reinforcing bar surface 30s portion. Therefore, when the reinforcing bar 30 has no portion such as the rib 31, the direction of setting is not particularly limited.

Next, the first bending angle measurement step S2 is performed. As illustrated in FIG. 5, in the first bending angle measurement step S2, the effort member 20 is rotated to bend the reinforcing bar 30 to a predetermined bending angle ($\theta$1=90 degrees). Then, the effort member 20 is slightly rotated in the opposite direction (counterclockwise direction) to release the bending force of the effort member 20 with respect to the reinforcing bar 30. In the state in which the bending force is released, the bending angle of the reinforcing bar 30 is measured, and a springback amount $\Delta\theta$1 by which the bending angle recovers from the state of $\theta$1 is measured. Note that the amount of rotation in the opposite direction is not particularly specified, and any may be sufficient as long as the springback amount can be measured.

Next, the second bending angle measurement step S3 is performed. As illustrated in FIG. 5, in the second bending angle measurement step S3, the effort member 20 is rotated again in the clockwise direction with respect to the reinforcing bar 30 from which the bending force of the effort member 20 is released, thus bending it to the next bending angle ($\theta$2=120 degrees). Then, the effort member 20 is slightly rotated in the opposite direction to release the bending force of the effort member 20 with respect to the reinforcing bar 30 again. In the state in which the bending force is released, the bending angle of the reinforcing bar 30 is measured, and a springback amount $\Delta\theta$2 by which the bending angle recovers from the state of $\theta$2 is measured.

Next, the secondary second bending angle measurement step S3 is performed. This secondary second bending angle measurement step S3 is performed at an angle greater than the initial measurement step. In this case, again, after rotating the effort member 20 in the clockwise direction to the bending angle ($\theta$3=150 degrees) with respect to the reinforcing bar 30 from which the bending force of the effort member 20 is released, the effort member 20 is rotated in the opposite direction to release the bending force of the effort member 20 with respect to the reinforcing bar 30 again. In the state in which the bending force is released, the bending angle of the reinforcing bar 30 is measured, and the springback amount $\Delta\theta$3 by which the bending angle recovers from the state of $\theta$3 is measured.

Next, the tertiary second bending angle measurement step S3 is performed. This tertiary second bending angle measurement step S3 is performed again at a greater angle. In this case, again, after rotating the effort member 20 in the clockwise direction to the bending angle ($\theta$4=180 degrees) with respect to the reinforcing bar 30 from which the bending force of the effort member 20 is released, the effort member 20 is rotated in the opposite direction to release the bending force of the effort member 20 with respect to the reinforcing bar 30 again. In the state in which the bending force is released, the bending angle of the reinforcing bar 30 is measured, and the springback amount $\Delta\theta$4 by which the bending angle recovers from the state of $\theta$4 is measured.

Next, the springback prediction step S4 is performed. This springback prediction step S4 is a process of using the measurement results of springback amount $\Delta\theta$ at each bending angles $\theta$1, $\theta$2, $\theta$3 and $\theta$4 of 90, 120, 150, and 180 degrees described above. That is, the springback amount $\Delta\theta$ at a predetermined angle can be predicted based on the measurement results.

Hereinafter, the prediction of the springback amount $\Delta\theta$ will be described with respect to experimental data. Note that FIG. 6 graphically represents the relationship between the rotation angle of the effort member and the springback amount (angle).

Figure 6:
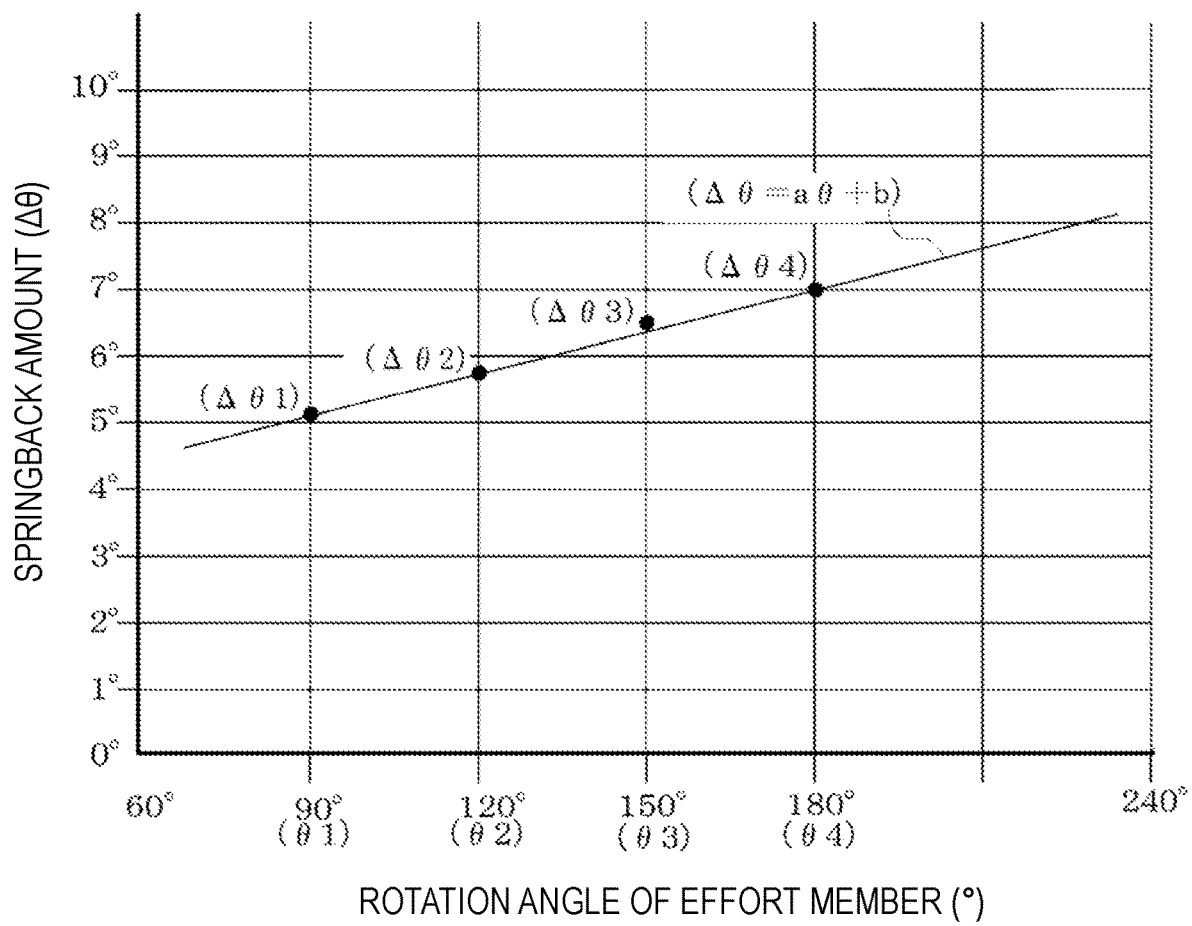
FIG. 6 is a graph representing the relationship between a rotation angle of an effort member and a springback amount (angle)

The data obtained in the measurements of the first bending angle measurement step S2 and the second bending angle measurement step S3 described above are represented as shown in the graph of FIG. 6, for example. In this graph, the vertical axis represents the springback amount $\Delta\theta$, and the horizontal axis represents the rotation angle of the effort member 20 (bending angle $\theta$ of the reinforcing bar 30). As can be seen from this graph, the springback amount $\Delta\theta$ indicates that the relationship with the bending angle $\theta$ can be defined as $\theta$=f($\theta$). As illustrated in the related art, when this relational expression is a linear expression as in the case of using bending results of other samples for the uniform members or of different portions of the same sample, then it is expressed by $\Delta\theta$=a$\theta$+b. When the thickness and shape of the reinforcing bar 30 are different, the inclination angle (coefficient a) and the constant b of the graph are expressed as different functions.

In the example illustrated in FIG. 6, although the second bending angle measurement step S3 is performed three times, it may be performed at least once. Further, although the relationship between the bending angle and the springback amount is predicted based on the measurement results When the predetermined bending angle $\theta$1 in the first bending angle measurement step is 90 degrees and the measurement results when another bending angles $\theta$2, $\theta$3, and $\theta$4 in the second bending angle measurement steps are 120, 150, and 180 degrees, the predetermined bending angle and another bending angles are not limited to the values described above. For example, it can be appropriately selected according to the target bending angle θs in the bending process described below.

For example, when the target bending angle θs, which is the final bending angle, is 90 degrees, as in the example illustrated in FIG. 6, it is not necessary to bend up to 180 degrees for prediction, as it suffices to measure the springback amounts when bending at a plurality of appropriate angles within the bending angle of 0 to 90 degrees. That is, after the prediction of the springback amount, it will suffice to determine a predetermined bending angle in the first bending angle measurement step and another bending angle in the second bending angle measurement step, based on the target bending angle when bending the same type of reinforcing bar as the reinforcing bar used for the prediction. Further, when determining a predetermined bending angle in the first bending angle measurement step and another bending angle in the second bending angle measurement step, it is preferable to set the appropriately distributed angles.

Figure 7:
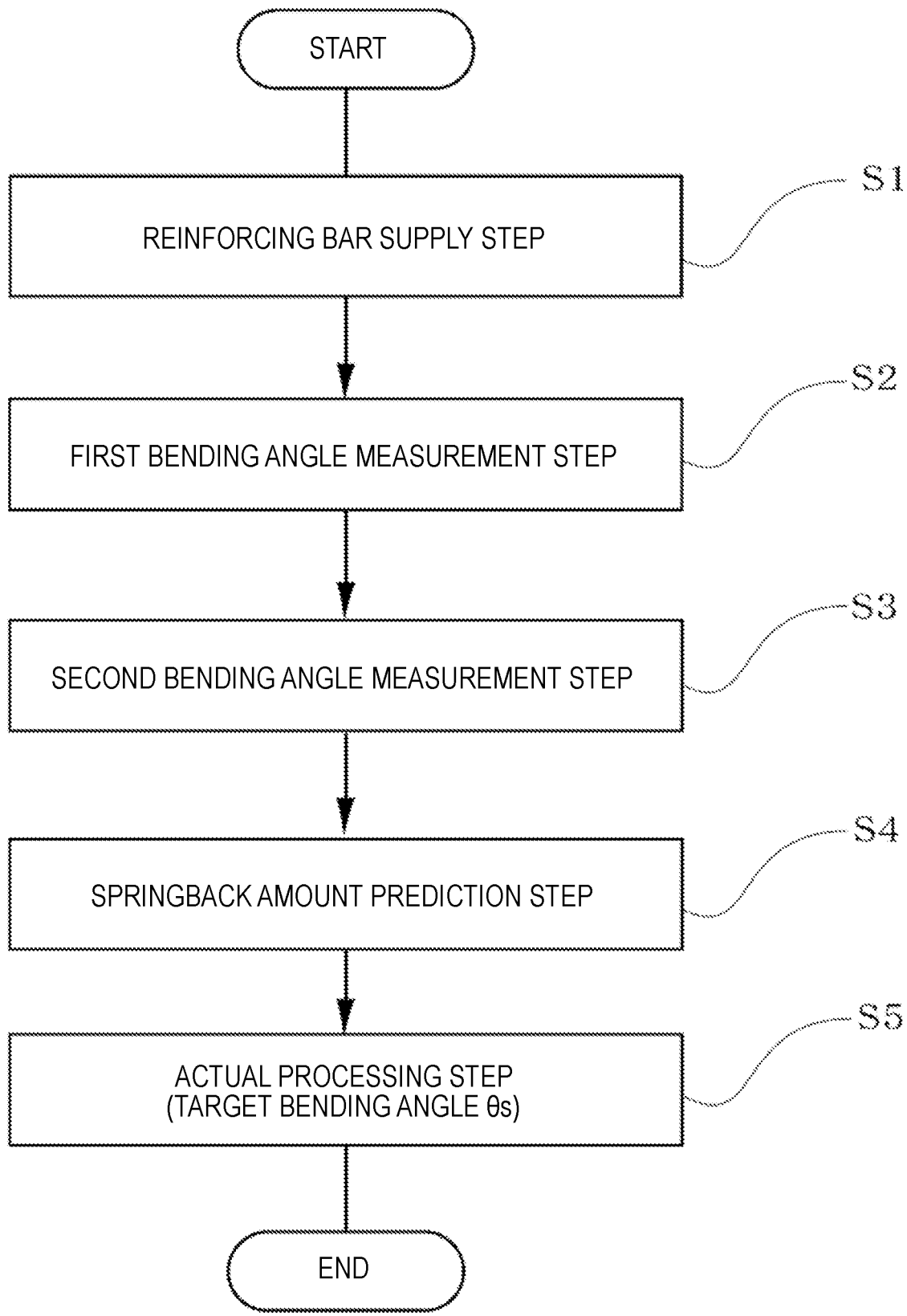
FIG. 7 is a flowchart of an example of a method for bending a reinforcing bar using the method for predicting the springback amount.

Hereinafter, a method for bending the reinforcing bar 30 using the method for predicting a springback amount described above will be described. FIG. 7 illustrates a flowchart of an example of a method for bending a reinforcing bar using a method for predicting a springback amount. The bending process illustrated in FIG. 7 is an example of bending the portions to be bent used in the prediction method illustrated in FIG. 4 to the target bending angle θs.

As illustrated in FIG. 7, when performing the method for bending the reinforcing bar 30, the reinforcing bar 30 is set in the reinforcing bar bending device 1, and the process is performed from the reinforcing bar supply step S1 to the springback prediction step S4. After performing the process up to the springback prediction step S4, by using this prediction data, the process is moved to an actual processing step S5 by the same reinforcing bar bending device 1.

After the prediction is performed based on the measurement result illustrated in FIG. 6, when further bending is performed to a predetermined angle of 200 degrees for example, by using the linear function obtained from the above measurement results, the effort member 20 is rotated and bent to an angle θt, where θt−Δθt=200. That is, when the effort member is rotated to θt=(200+b)/(1−a), since only the springback amount Δθ1 is recovered, the final bending angle (target bending angle θs) is 200 degrees.

As described above, the bending method illustrated in FIG. 7 includes setting the reinforcing bar 30 for actual bending in the reinforcing bar bending device 1, acquiring data by performing both angle measurement steps S2 and S3 for predicting the springback amount, performing the calculation (step S4) in a short time until the final bending angle, and processing to the set bending angle. That is, by turning the final turning angle of the effort member 20 to the bending angle obtained based on the predicted springback amount, a product having the target bending angle θs is obtained.

When bending another portion of the reinforcing bar used to predict the springback amount, and when bending the same type of reinforcing bar that has the same material, size and shape as the reinforcing bar used to predict the springback amount, if the reproducibility of the bending state is ensured, the prediction of the springback amount for each bending portion may not be performed. That is, the process up to the springback prediction step S4 is performed with respect to the initially set reinforcing bar, and the relationship between the bending angle and the springback amount is stored in the reinforcing bar bending device 1. Then, based on this stored data, subsequent multiple bending processes are performed. In this case, when the reinforcing bar manufacturer and the manufacturing lot of the reinforcing bar are the same, it is possible to perform bending with less error with respect to the same type of reinforcing bars based on the first prediction result. On the other hand, with respect to reinforcing bars with different manufacturing lots or from different manufacturers, and the like, it is preferable to perform the springback prediction.

As described above, with the method for predicting a springback amount of the present embodiment, when the reinforcing bar 30 is supplied to the reinforcing bar bending device 1 and bent by the effort member 20 centering on the fulcrum member 10 for bending, the bending angle measurement step of releasing the bending force by the effort member 20 during bending of the reinforcing bar 30 and measuring the springback amount Δθ of the reinforcing bar 30 at that time is performed a plurality of times at different bending angles with respect to the same portion. Since the springback amount Δθ of the reinforcing bar 30 at a specific bending angle is predicted based on the results of the plurality of measurements of the springback amount a plurality of times, measuring is easy, and the springback amount at a specific bending angle can be predicted quickly and accurately. As a result, it is not necessary to examine the work for predicting the springback amount in the reinforcing bar bending process, and it is possible to bend the reinforcing bar in a short time and quickly.

Further, when predicting the springback amount Δθ, by setting the measurement angle of the bending angle measurement step, that is, by setting the bending angle based on the target bending angle θs, it is possible to distribute angles suitably for the target bending angle θs, and thereby select the optimum angle for accurate prediction of the springback amount.

In the method for predicting a springback amount of the present embodiment, since the bending angle of the reinforcing bar 30 is measured by using an image captured from a direction orthogonal to the reference surface portion 5 of the bending process, angle data (position displacement data) can be obtained as a two-dimensional image, and this facilitates calculation, thereby enables to increase in high-speed for a springback amount prediction process.

Further, in the method for predicting a springback amount of the present embodiment, the number of times of executions of the second bending angle measurement step S3 is not specified, but by executing the second bending angle measurement step S3 two or more times, the springback amount is measured three or more times, which enables accurate prediction based on more measurement data.

Further, in the bending method of the present embodiment, since the actual bending machine is same for both the reinforcing bar bending device 1 used for predicting the springback amount and the reinforcing bar bending device 1 used for actual production, the error of the predicted numerical value can be reduced. As a result, the springback amount can be predicted extremely accurately, and the reinforcing bar 30 can be bent to an extremely accurate target bending angle θs. In addition, a test device in addition to the actual device for bending is not required, which saves equipment.

Further, in the bending method of the present embodiment, when bending the reinforcing bar 30, since the springback amount is predicted based on the measurement values of the springback amount of the reinforcing bar itself that is the subject to be bent, extremely accurate bending process is possible.

Although one embodiment according to the present disclosure has been described above, the disclosure is not limited thereto, and it can be appropriately modified within the scope according to the present disclosure.

Further, in the embodiment described above, the example of the shape of the reinforcing bar 30 illustrated in FIGS. 3A and 3B has been described, but different shape of the irregularities may be formed by the ribs 31, the nodes 32, or the like.

What is claimed is:

1. A method for predicting a springback amount associated with a target bending angle during a bending process of a deformed reinforcing bar to the target bending angle by using a reinforcing bar bending device including a fulcrum member configuring a fulcrum in the bending process and an effort member rotated around the fulcrum member, the method comprising:
    supplying the deformed reinforcing bar to the reinforcing bar bending device;
    bending the deformed reinforcing bar by rotating the effort member to a predetermined bending angle, and subsequently measuring a first bending angle of the deformed reinforcing bar in state of releasing a bending force of the effort member on the deformed reinforcing bar;
    further bending deformed reinforcing bar from which the bending force of the effort member has been released to another bending angle, and subsequently measuring a second bending angle of the deformed reinforcing bar in a state of releasing the bending force of the effort member on the deformed reinforcing bar; and
    predicting the springback amount associated with the target bending angle based on the first bending angle and the second bending angle,
    wherein the another bending angle is greater than the predetermined bending angle,
    the deformed reinforcing bar has a cross-sectional shape in which a first portion of an outer circumference of the deformed reinforcing bar is formed higher than a second portion of the outer circumference of the deformed reinforcing bar,
    the first portion of the outer circumference of the deformed reinforcing bar includes a rib that extends in a longitudinal direction of the deformed reinforcing bar, and
    supplying the deformed reinforcing bar to the reinforcing bar bending device includes positioning the deformed reinforcing bar on a reference surface portion of the reinforcing bar bending device such that the rib is oriented in a predetermined orientation to the reference surface portion, the reference surface portion forming a reference plane that determines a bending direction during bending of the deformed reinforcing bar.

2. The method according to claim 1, wherein
    the predetermined bending angle and the another bending angle are determined based on the target bending angle.

3. A method for bending a deformed reinforcing bar by using the method for predicting a springback amount according to claim 1, comprising:
    bending another deformed reinforcing bar to a set bending angle which is determined based on the target bending angle and the predicted springback amount, by using the reinforcing bar bending device that is used for predicting the springback amount.

4. The method according to claim 1, wherein
    in supplying the deformed reinforcing bar to the reinforcing bar bending device, the deformed reinforcing bar is positioned on the reference surface portion of the reinforcing bar bending device such that the rib is oriented in a direction orthogonal to the reference surface portion.

5. The method according to claim 3, further A method for bending a deformed reinforcing bar to a target bending angle using a reinforcing bar bending device including a fulcrum member configuring a fulcrum in a bending process and an effort member rotated around the fulcrum member, the method comprising:
    supplying the deformed reinforcing bar to the reinforcing bar bending device;
    bending the deformed reinforcing bar by rotating the effort member to a predetermined bending angle, and subsequently measuring a first bending angle of the deformed reinforcing bar in state of releasing a bending force of the effort member on the deformed reinforcing bar;
    further bending the deformed reinforcing bar from which the bending force of the effort member has been released to another bending angle, and subsequently measuring a second bending angle of the deformed reinforcing bar in a state of releasing the bending force of the effort member on the deformed reinforcing bar;
    predicting a springback amount associated with the target bending angle based on the first bending angle and the second bending angle; and
    further bending the deformed reinforcing bar to a set bending angle using the reinforcing bar bending device, the set bending angle being determined based on the target bending angle and the predicted springback amount,
    wherein the deformed reinforcing bar a cross-sectional shape in which a first portion of an outer circumference of the deformed reinforcing bar is formed higher than a second portion of the outer circumference of the deformed reinforcing bar,
    the another bending angle is greater than the predetermined bending angle,
    the first portion of the outer circumference of the deformed reinforcing bar includes a rib that extends in a longitudinal direction of the deformed reinforcing bar, and
    supplying the deformed reinforcing bar to the reinforcing bar bending device includes positioning the deformed reinforcing bar on a reference surface portion of the reinforcing bar bending device such that the rib is oriented in a predetermined orientation to the reference surface portion, the reference surface portion forming a reference plane that determines a bending direction during bending of the deformed reinforcing bar.

6. The method according to claim 5, wherein
    in supplying the deformed reinforcing bar to the reinforcing bar bending device, the deformed reinforcing bar is positioned on the reference surface portion of the reinforcing bar bending device such that the rib is oriented in a direction orthogonal to the reference surface portion.

* * * * *